US005905310A

United States Patent [19]

Nagao

[11] Patent Number: 5,905,310

[45] Date of Patent: May 18, 1999

[54] STARTER WITH SHOCK ABSORBING DEVICE

[75] Inventor: Yasuhiro Nagao, Kariya, Japan

[73] Assignee: Denso Corporation, Kariya, Japan

[21] Appl. No.: 08/798,133

[22] Filed: Feb. 12, 1997

[30] Foreign Application Priority Data

Feb. 15, 1996 [JP] Japan .................................... 8-027462
Dec. 6, 1996 [JP] Japan .................................... 8-326365

[51] Int. Cl.[6] ........................... F02N 11/04; H02K 23/52; H02P 9/04

[52] U.S. Cl. ........................ 290/46; 290/36 R; 290/38 A; 290/38 R; 290/49; 74/7 A; 74/7 E

[58] Field of Search ................................ 290/38 R, 38 A, 290/46, 49; 74/7 A, 7 E, 411, 801, 785; 310/83

[56] References Cited

U.S. PATENT DOCUMENTS 4,503,719 3/1985 Hamano .................................... 74/7 E
4,635,489 1/1987 Imamura et al. ......................... 74/7 E
4,680,979 7/1987 Morishita et al. ........................ 74/7 E
4,848,172 7/1989 Morishita .................................. 74/7 E
4,891,996 1/1990 Isozumi et al. ............................... 74/6
5,267,918 12/1993 Shiroyama ............................. 475/331
5,323,663 6/1994 Ohgi et al. .................................... 14/7
5,688,203 11/1997 Yamamoto et al. .................... 475/331

FOREIGN PATENT DOCUMENTS 57-55970 12/1982 Japan .

*Primary Examiner*—Elvin G. Enad
*Attorney, Agent, or Firm*—Pillsbury Madison & Sutro LLP

[57] ABSTRACT

In a starter, a planetary gear reduction mechanism has pins supporting planetary gears and directly fitted into an outer member of a one-way clutch. The outer member rotates with the revolution of the planetary gear. An internal gear engaged with the planetary gears is connected with a rotary disk of a shock absorbing device disposed on the outer periphery of the one-way clutch through a connecting member and an elastic member. The connecting member has engaging projections engaged with the elastic member within the connecting recess of the internal gear. The engagement projections are housed within the connecting recess with some clearance provided in the radial direction. The internal gear is thus held radially movably with respect to the rotary disk via the connecting member.

7 Claims, 3 Drawing Sheets

STARTER WITH SHOCK ABSORBING DEVICE

CROSS REFERENCE TO RELATED APPLICATION

This application is based on and claims priorities of Japanese Patent Applications No. 8-27462 filed on Feb. 15, 1996 and No. 8-326365 filed on Dec. 6, 1996, the contents of which are incorporated herein by reference.

BACKGROUND OF THE INVENTION

1. Field of the Invention

The present invention relates to a starter for cranking an engine.

2. Related Art

A conventional starter is disclosed in Japanese Examined Utility Model Publication No. Sho 57-55970.

The starter is comprised of a planetary gear reduction mechanism for reducing the speed of starting motor rotation, and a one-way clutch for transmitting to an output shaft the motor rotation reduced by the planetary gear reduction mechanism. Planetary gears of the planetary gear reduction mechanism are rotatably mounted to the outer member of the one-way clutch by press-fitting or like mounting method. That is, the one-way clutch is unmovably arranged with respect to the output shaft so that only a pinion is fitted on the output shaft so as to be axially movable via a helical spline. Thus it becomes possible to decrease a force required to move the pinion as compared with the structure in which the one-way clutch and the pinion will move together on the output shaft, thereby enabling miniaturizing a magnet switch which is operated when the pinion moving force is required.

The center of the outer member will be determined by a relation of gears constituting the planetary gear reduction mechanism by directly securing, to the outer member, the pin supporting the corresponding planetary gear. However, since the outer member is a component part of the one-way clutch, the center of the outer member is determined by a relation between an inner member and a roller. It is, therefore, necessary that the center of the outer member determined on the reduction mechanism side corresponds to the center of the outer member determined on the clutch side; the function of the clutch and the life of the reduction mechanism largely depend upon the centering accuracy. Consequently, parts making up the reduction mechanism and the clutch are required to have a high dimensional accuracy, resulting in a high cost. Especially when miniaturization is pursued, further enhancement of the dimensional accuracy will be needed.

SUMMARY OF THE INVENTION

It is therefore an object of the present invention to provide a starter in which centering a reduction mechanism side and a clutch side is simplified.

According to the present invention, an internal gear is installed so as to be radially movable with respect to a rotary member, so that the internal gear will make a displacement in the radial direction to align the center of a one-way clutch side with the center of a reduction mechanism side during torque transmission, thereby reducing deviation between the centers of the reduction mechanism side and the clutch side to acquire a good clutch performance.

Preferably, a shock absorbing device is provided on the outer periphery of the one-way clutch and both the shock absorbing device and the one-way clutch are disposed within a starter casing so that it is possible to miniaturize the starter making the best use of the space within the casing.

Preferably, an elastic body is interposed between the internal gear and the rotary member to reduce excessive torque. The clutch is required just to withstand a shock corresponding thereto, thus realizing miniaturization of the clutch.

BRIEF DESCRIPTION OF THE DRAWINGS

Other objects, features and advantages of the present invention will become more apparent from the following description and the appended claims, taken in conjunction with the accompanying drawings, in which:

DETAILED DESCRIPTION OF PRESENTLY PREFERRED EMBODIMENTS

Figure 1:
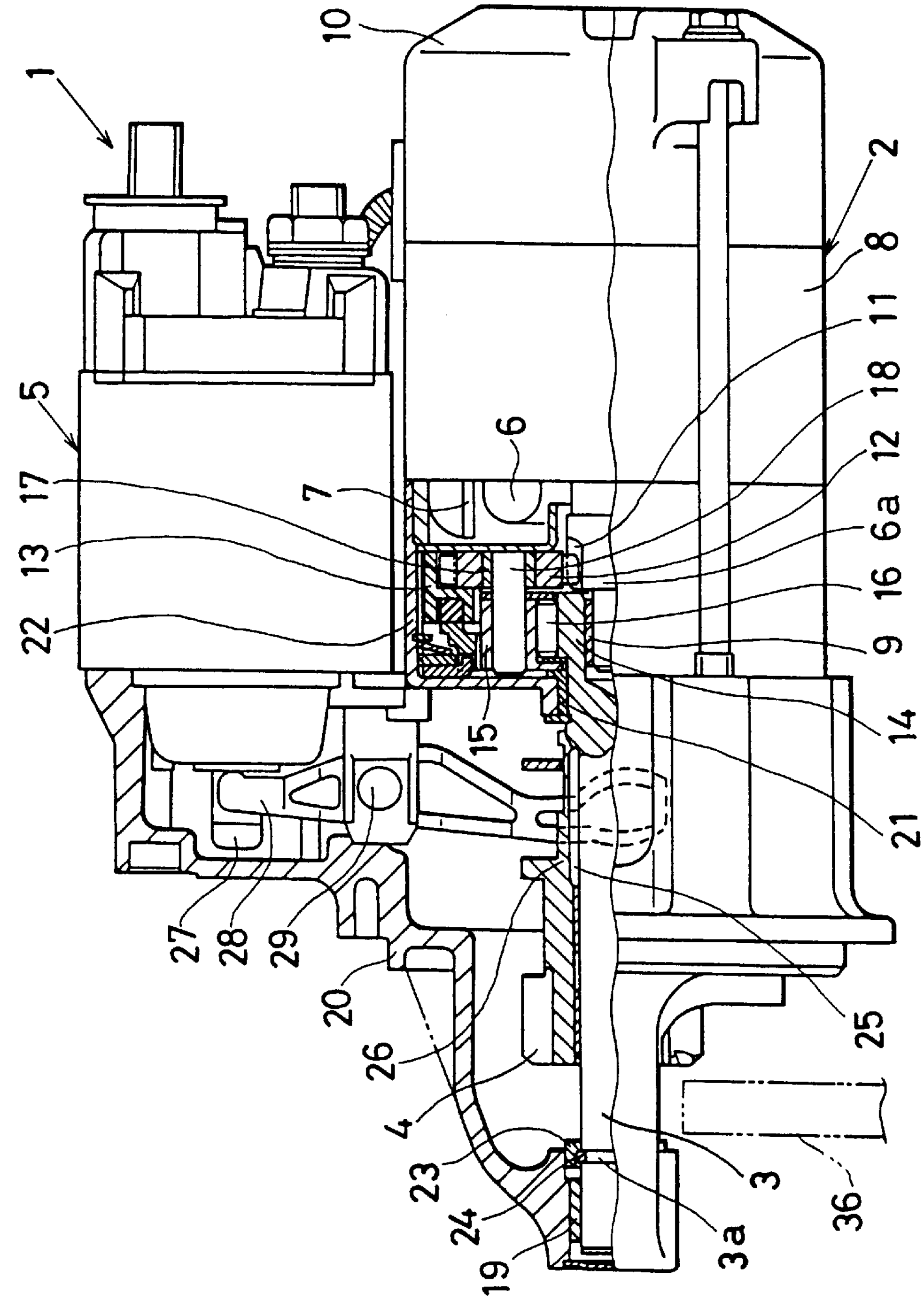
FIG. 1 is a partial sectional view of a starter according to a first embodiment of the present invention.

Next, a starter of the present invention will be described with reference to preferred embodiments shown in the accompanying drawings.

First Embodiment

A starter 1 of the present embodiment comprises a starting motor 2 which produces a torque when supplied with the electric power; a planetary gear reduction mechanism which reduces the rotational speed of the starting motor 2; a one-way clutch which transmits the rotation thus reduced by the reduction mechanism; a pinion gear 4 fitted movably on the outer periphery of an output shaft 3; a shock absorbing device which absorbs an excess torque added to the driving system; and a magnet switch 5 which generates a force to move the pinion gear 4 forward and controls the electric power supply to the starting motor 2.

The starting motor 2 is a known direct-current motor composed of an armature 6, fixed poles 7, and a cylindrical yoke 8. When a key switch (not shown) is operated to ON and a motor contact provided within the magnetic switch 5 is closed, the armature 6 is turned with the power supplied from a vehicle-mounted battery (not shown). An armature shaft 6*a* is rotatably supported at the forward end by a bearing 9 within a recess formed at the rear center part of the output shaft 3, and is rotatably supported at the rear end by a bearing (not shown) in an end cover 10.

The reduction mechanism comprises a sun gear 11 formed on the outer periphery of the armature shaft 6*a*, a plurality of planetary gears 12 engaged with the sun gear 11, and an internal gear 13 engaged with each of the planetary gears 12.

The reduction mechanism is of such a design that with the rotation of the sun gear 11 on the armature shaft 6*a*, each planetary gear 12 rotates while revolving around the outer periphery of the sun gear 11. The force of rotation is transmitted to the output shaft 3 through the one-way clutch.

The one-way clutch includes an inner member 14 formed integrally with the rear end of the output shaft 3, an outer member 15 positioned radially oppositely to the outer periphery of the inner member 14, a plurality of rollers 16 housed in corresponding wedge-type cam chambers (not shown) formed between the outer member 15 and the inner member 14, and springs (not shown) pressing the roller 16 toward the narrow part of the cam chamber. In the one-way clutch, pins 18 rotatably supporting the corresponding planetary gears 12 through corresponding bearings 17 are fixed by pressing into the outer member 15, so that the outer member 15 rotates with the revolution of the planetary gears 12.

The output shaft 3 is arranged coaxially with the armature shaft 6*a* at the front of the armature shaft 6*a*, and is rotatably supported by a bearing 19 at the front end portion of a front housing 20 and is also rotatably supported by a bearing 21 in the small-diameter portion of a center casing 22. On the front end portion of the output shaft 3, a stopper collar 23 for restricting the axial advance position of the pinion gear 4 is mounted. The stopper collar 23 is engaged with a snap ring 24 which is fitted in a groove 3a formed in the outer periphery of the output shaft 3, thereby restricting its axial movement.

The pinion gear 4 which is engageable with an engine ring gear 36 is formed integrally with a spline tube 26 fitted on the output shaft 3 through a helical spline 25, and can move back and forth on the output shaft 3 along the helical spline 25.

The magnet switch 5 has, although not shown, a solenoid coil energized by turning on the key switch, a plunger slidably disposed within the hollow part of this coil, and the motor contact. With the attraction of the plunger by the magnetic force of the coil, the motor contact is closed, to thereby drive a lever 28 through a joint 27 linked to the plunger.

The lever 28, connected at one end to the joint 27 and at the other end to the outer periphery of the spline tube 26, can turn around the center of a fulcrum 29 provided in the front housing 20.

Figure 2:
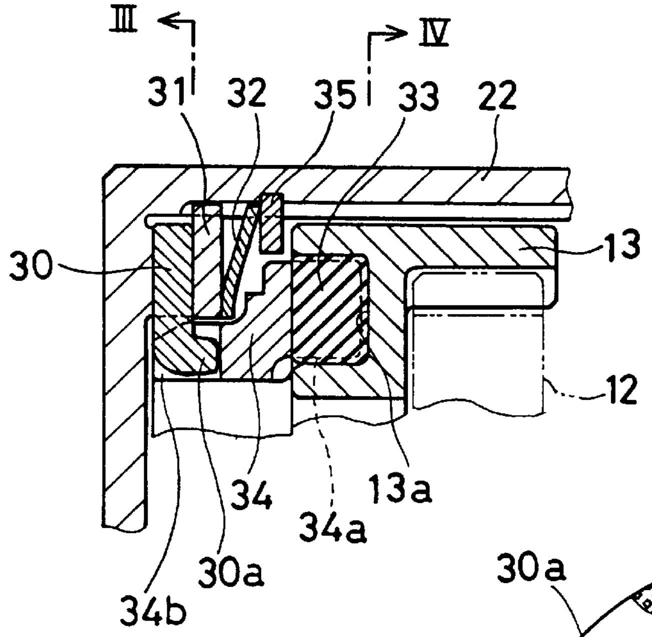
FIG. 2 is a sectional view of a shock absorbing device in the first embodiment.

The shock absorbing device, as shown in FIG. 2, includes such components as a rotary disk 30, a stationary disk 31, a disk spring 32, an elastic member 33, and a connecting member 34, and is disposed on the outer periphery of the one-way clutch within the center casing 22.

Figure 3:
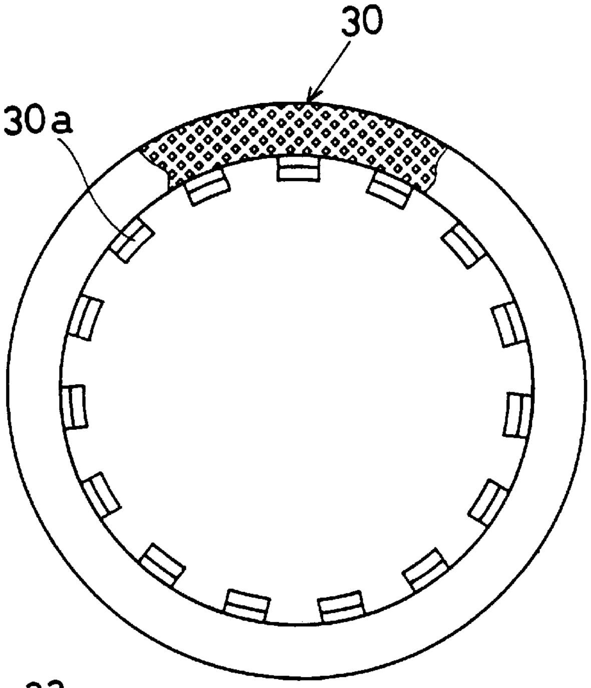
FIG. 3 is a front view of a rotary disk in the first embodiment.

The rotary disk 30 has a shape of ring and a roughened surface for frictional engagement as shown in FIG. 3, and is installed rotatably with respect to the center casing 22 and so as to be movable in a radial direction. On the inner periphery of the rotary disk 30 there are provided a plurality of claws 30*a* connected with the connecting member 34. The stationary disk 31, axially arranged to face the rotary disk 30, is installed nonrotatably but axially movably with respect to the center casing 22.

The disk spring 32 is cone-shaped, disposed adjacently to the stationary disk 31 at the opposite side of the rotatable disk 30, and positioned by a circlip 35 to the center casing 22, to thereby press the stationary disk 31 toward the rotary disk 30.

Figure 4:
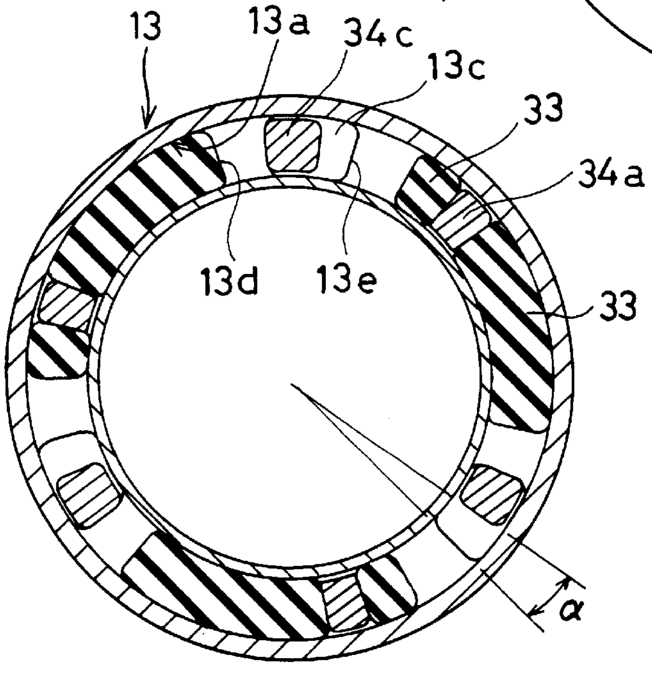
FIG. 4 is a front view showing an installed state of an elastic member in the first embodiment.

The elastic member 33 is made of, for instance, rubber and, as shown in FIG. 4, installed within an annular connecting recess section 13*a* provided integrally with the internal gear 13.

Figure 5A:
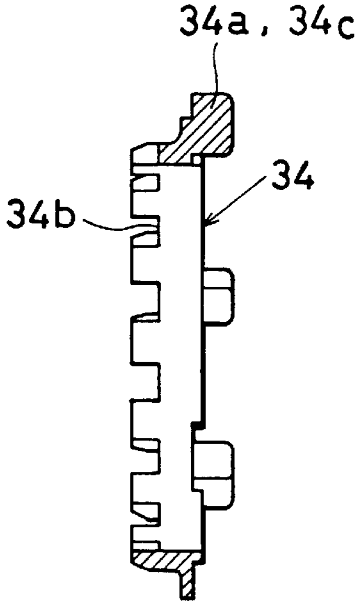
FIGS. 5A and 5B are respectively side and front views of a connecting member in the first embodiment.
Figure 5B:
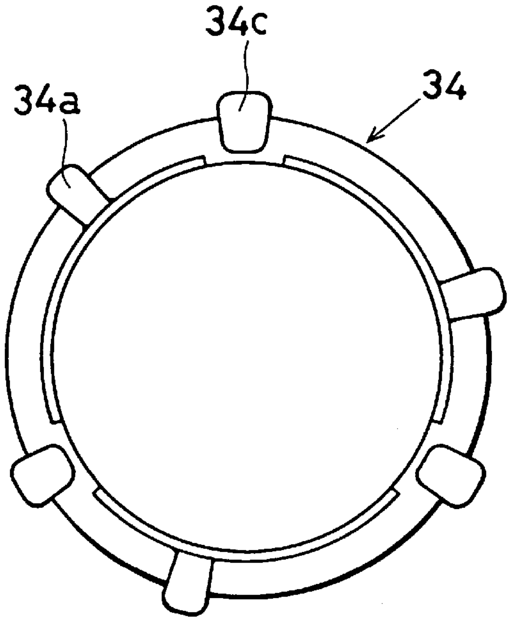

The connecting member 34 serves to connect the internal gear 13 with the rotary disk 30 through the elastic member 33, and forms an annular member as shown in FIGS. 5A and 5B. On the outer peripheral side of the connecting member 34, engaging projections 34*a* and 34*c* are provided in connecting recesses 13*a* and 13*c* of the internal gear 13. The engaging projection 34*a* is provided to receive the torque from the peripheral wall section 13*d* of the connecting recess 13*a* through the elastic member 33. The engaging projection 34*c* is arranged off the peripheral wall section 13*e* so that when the internal gear 13 turns a predetermined angle of rotation ($\alpha$) in relation to the connecting member 34, the torque of the internal gear 13 will directly be transmitted to the connecting member 34.

The engaging projections 34*a* and 34*c* are housed within the connecting recesses 13*a* and 13*c* respectively with a slight clearance provided in a radial direction as shown in FIG. 2. Therefore, the connecting member 34 and the internal gear 13 are so installed as to make the same amount of radial relative displacement as the clearance between the two parts.

On the rotary disk side of the connecting member 34, as shown in FIG. 5A, there are provided a plurality of engaging recesses 34*b* in which the claws 30*a* of the rotary disk 30 are engaged. A slight clearance may be provided also between the claw 30*a* and the engaging recess 34*b* in order that the connecting member 34 can be radially displaced in relation to the rotary disk 30.

Therefore, the internal gear 13 connected to the rotary disk 30 via the connecting member 34 and the elastic member 33 is rotatable (rotation is restricted during ordinary torque transmission) with respect to the center casing 22, and is also be radially displaceable.

The shock absorbing device restricts the rotation of the rotary disk 30 by the frictional engagement of the rotary disk 30 with the stationary disk 31 being pressed by the cone disk spring 32. When an excess torque exceeding a stationary torque generated by the frictional force between the stationary disk 31 and the rotary disk 30 is applied to the driving system, the rotary disk 30 slips (rotates) in relation to the stationary disk 31, absorbing the excess torque. Further, in case of a shock torque which is less than the excess torque, the rotary disk 30 will not slip in relation to the stationary disk 31, but the elastic member 33 is deformed within the connecting recess 13*a*, thereby absorbing the shock torque. The first embodiment operates as follows.

When the key switch is turned ON, the solenoid coil in the magnet switch 5 is energized to attract the plunger, the lever 28 connected to the joint 27 turns clockwise around the center of the fulcrum 29. As a result, the spline tube 26 connected to the lever 28 is pushed out toward the ring gear 36 along the helical spline 25 on the output shaft 3, thereby moving the pinion gear 4 provided integrally with the spline tube 26.

In the meantime, when the motor contact in the magnet switch 5 is closed, the current flows from the battery to the starting motor 2, turning the armature 6 to generate a rotary torque. The rotation of the armature 6, after being reduced by the reduction mechanism, is transmitted to the output shaft 3 through the one-way clutch. Thus the pinion gear 4 rotates together with the output shaft 3 to come into mesh with the ring gear 36, thereby transmitting the torque of the starting motor 2 to the ring gear 36 to start the engine. Here, the excess torque occurring when the pinion gear 4 is engaged with the ring gear 36 is absorbed because the rotary disk 30 of the shock absorbing device slips on the stationary disk 31. Further, a shock torque (less than the excess torque at the time of engagement of the pinion gear 4 with the ring gear 36) caused by a change in engine load is absorbed by the deformation of the elastic member 33 within the connecting recess 13*a*.

After the engine has started, the key switch is turned to OFF to stop the operation of the magnet switch 5 and the plunger that has been attracted moves back to the initial position. The lever 28 connected to the joint 27 turns counter-clockwise. As a result, the spline tube 26 connected to the lever 28 is withdrawn along the helical spline 25 on the output shaft 3, and therefore the pinion gear 4 moves away from the ring gear 36, moving back on the output shaft 3 to return to the rest position. Furthermore, with the return of the plunger, the motor contact within the magnet switch 5 is opened to stop supplying the electric power to the starting motor 2, thus stopping the rotation of the armature 6.

In the present embodiment, the internal gear 13 is arranged movably in the radial direction with respect to the rotary disk 30, so that the centers of the reduction mechanism side and the one-way clutch side will coincide at the time of normal starting. Thus a deviation between the center portions of the reduction mechanism side and the one-way clutch side is reduced, thereby assuring good clutch performance.

In the miniaturized starter, each component part is demanded to have a high dimensional accuracy. Because the centering is carried out by utilizing the radial displacement of the internal gear 13, the component parts constituting the reduction mechanism and the one-way clutch are required only to have the same degree of dimensional accuracy as conventional ones.

Furthermore, the shock absorbing device can restrain an increased shock which will result when the starter 1 is designed to engage the pinion gear 4 with the ring gear 36 tightly. The shock absorbing device on the outer periphery of the miniaturized one-way clutch can decrease an unnecessary space within the center casing 22 without reducing the size of the center casing 22 along the external shape of the one-way clutch (without increasing the number of manufacturing processes). It is, therefore, possible to provide the starter 1 having good environmental stability such that little negative pressure is built up in the center casing 22 even if the starter 1 is suddenly cooled when the vehicle travels in a waterway or the like, thereby preventing the entry of water by the negative pressure into the center casing. Accordingly the grease which will be decreased in amount accompanying clutch miniaturization will not leak together with water from the clutch.

Second Embodiment

Figure 6A:
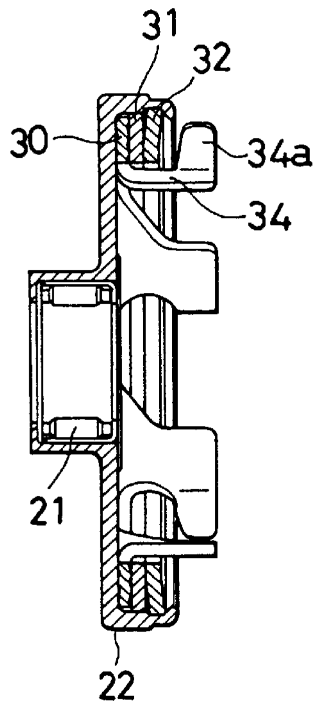
FIGS. 6A and 6B are respectively a side sectional view and a front view of a shock absorbing device in a second embodiment of the present invention.
Figure 6B:
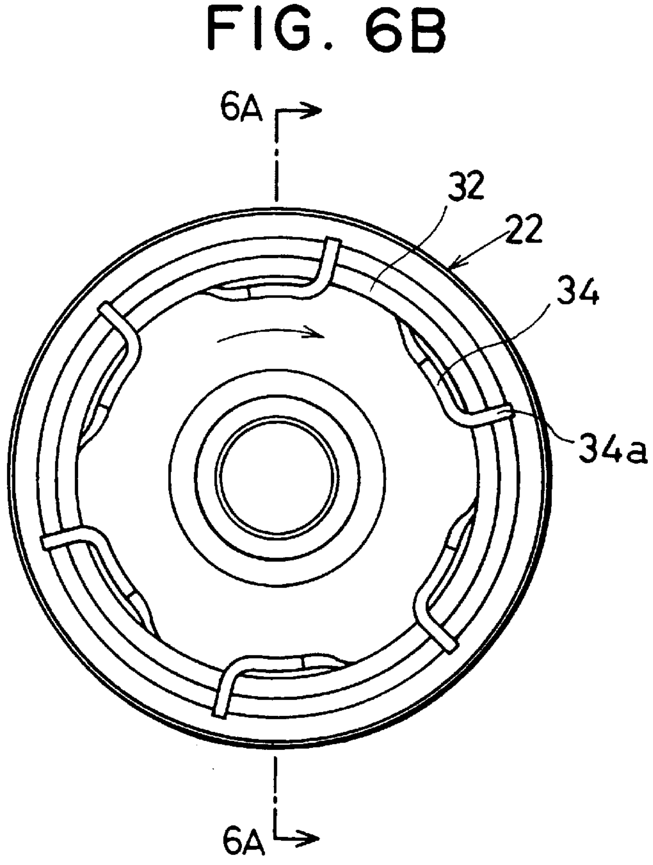

In the present embodiment, a rotary disk 30 and a connecting member 34 of a shock absorbing device are formed as one body as shown in FIGS. 6A and 6B.

The rotary disk 30 and the connecting member 34 can be formed by bending each connecting member 34 up nearly to a right angle in relation to the rotary disk 30 after punching, for instance, a metal plate by a pressing process into a predetermined shape having a plurality of connecting members 34 on the inner periphery of the rotary disk 30, and further by bending up an engaging projection 34*a* of each connecting member 34 to a predetermined angle as shown in FIG. 6B.

In the present embodiment also, the engaging projection 34*a* of the connecting member 34 is housed with a slight space provided in the radial direction within the connecting recess 13*a* of the internal gear 13 of the first embodiment, and is so installed that the connecting member 34 and the internal gear 13 can make a relative displacement in the radial direction. That is, the starter is so constructed that the internal gear 13 can be radially displaced in relation to the rotary disk 30.

What is claimed is:

1. A starter comprising:

an output shaft;

a pinion gear mounted so as to be movable in an axial direction on the output shaft;

a starting motor for driving the output shaft;

a planetary gear reduction mechanism for reducing the speed of rotation of the starting motor, said planetary gear reduction mechanism having planetary gears, pins rotatably supporting the planetary gears and an internal gear engaged with the planetary gears;

a one-way clutch for transmitting the rotation to the output shaft after speed reduction by the planetary gear reduction mechanism, the one-way clutch having an inner member integrally formed by the output shaft, an outer member disposed radially outside of the inner member and fitted with the pins, and rollers disposed between the inner member and the outer member; and a shock absorbing device having a nonrotatably-mounted stationary member, a rotary member connected with the internal gear to integrally rotate with the internal gear, and a frictional engaging means for frictionally engaging the stationary member with the rotary member, the rotary member being rotatable with respect to the stationary member to absorb an excess torque exceeding a stationary torque produced by the functional force between the stationary member and the rotary member when the excess torque is applied, wherein the internal gear is constructed and arranged to be radially movable with respect to the rotary member.

2. The starter according to claim 1, wherein:

the stationary member is a casing integral with a yoke of the starting motor;

the shock absorbing device and the one-way clutch are arranged inside the casing; and the shock absorbing device is disposed on an outer periphery of the one-way clutch.

3. The starter according to claim 1, wherein:

the shock absorbing device has an elastic member interposed between the internal gear and the rotary member; and the elastic member is constructed and arranged to be elastically deformable by a lower rotary torque than the stationary torque, to produce a relative rotation between the internal gear and the rotary member.

4.A starter comprising:

an output shaft;

a starting motor for driving the output shaft;

a casing fixed to the starting motor;

a planetary gear reduction mechanism disposed in the casing and having planetary gears, pins rotatably supporting the planetary gears and an internal gear engaged with the planetary gears and surrounding the planetary gears, said planetary gear reduction mechanism for reducing the speed of rotation of the starting motor;

a one-way clutch for transmitting the rotation of the starting motor to the output shaft after speed reduction by the planetary gear reduction mechanism, the one-way clutch being disposed in the casing and having an inner member integral with the output shaft and an outer member disposed radially outside of the output shaft and fitted with the pins; and connecting means disposed radially outside the one-way clutch for connecting the internal gear to the casing through frictional engagement, said connecting means holding the internal gear so as to be radially movable.

5. The starter according to claim 4, wherein:

the internal gear has an annular recess;

the connecting means includes a rotary disk disposed around the one-way clutch and in frictional contact with the casing, and a connecting member interposed between the rotary disk and the internal gear and having a projection received in the annular recess; and the annular recess of the internal gear and the projection of the connecting means are configured and dimensioned to allow radial movement of the internal gear relative to the connecting member.

6. The starter according to claim 5, wherein:

the connecting means further includes an elastically deformable member disposed in the annular recess of the internal gear together with the projection of the connecting member.

7. A starter for an engine having a ring gear comprising:

a starting motor having an armature;

an output shaft;

a pinion mounted on the output shaft so as to be movable in an axial direction for engagement with the ring gear;

a casing fixed to the starting motor;

a one-way clutch disposed in the casing, the clutch having a clutch member surrounding the output shaft and rollers disposed between the output shaft and the clutch member;

a planetary gear reduction mechanism disposed between the starting motor and the clutch in the casing, the reduction mechanism having planetary gears rotatably supported by the clutch member and an internal gear engaged with the planetary gears for transmitting a rotation of the armature in a reduced speed to the output shaft through the clutch, the internal gear being disposed with a spacing in a radial direction relative to the casing; and a holding mechanism disposed radially outside of the clutch in the casing and holding the internal gear of the reduction mechanism so as to be movable in the radial direction relative to the casing.

* * * * *